Patented Dec. 6, 1949

2,490,148

UNITED STATES PATENT OFFICE 2,490,148

THERMOPLASTIC COMPOSITION

William P. Moeller, Baldwin, N. Y., and John H. Prichard, Springfield, N. J., assignors to Celanese Corporation of America, a corporation of Delaware No Drawing. Application June 14, 1946, Serial No. 676,857

8 Claims. (Cl. 106—191)

This invention relates to plastic compositions, and relates more particularly to certain novel plasticized ethyl cellulose compositions which yield molded products of improved properties.

An object of this invention is to provide plasticized ethyl cellulose compositions which may be satisfactorily employed in extrusion and injection molding operations for the production of molded articles which are highly resistant to fuzzing, rub-up, skinning and to other undesirable changes in the surface characteristics of the molded articles.

Other objects of this invention will appear from the following detailed description.

Ethyl cellulose, when suitably compounded, is an excellent material for the manufacture of plastic articles by molding operations. The properties of the molded articles obtained may be varied somewhat depending upon the particular plasticizing agents incorporated in the ethyl cellulose composition. In general, articles having a basis of ethyl cellulose are distinguished by their high strength or toughness over a wide range of temperatures and their excellent dimensional stability under severe conditions of heat and moisture. However, molded ethyl cellulose articles of formulations heretofore available have certain undesirable surface characteristics which give rise to rather serious difficulties in the use of said ethyl cellulose compositions for the production of molded articles.

One of the most troublesome of these difficulties is the so-called skinning or surface lamination effect which is observed in articles molded from ethyl cellulose compositions. When a molded ethyl cellulose article is broken or cut with a knife, for example, a thin layer of the molded ethyl cellulose material can be readily peeled or skinned from the surface indicating a lack of homogeneity in the structure of the material. Another characteristic of molded ethyl cellulose articles which gives rise to fabrication difficulties is the fuzzing or rub-up effect which is observed when the surface of a molded object is rubbed with pressure or is buffed on a hard wheel. The rubbing or buffing causes a very fine layer of fuzzy fibers to form on the surface of the article, which detracts from its appearance. For this reason, ashing, buffing or polishing molded ethyl cellulose objects on a hard wheel, such as those used for polishing cellulose acetate objects, is unsatisfactory. Specially prepared waxes or polishing compounds must be used to insure a soft polishing, but such buffing or polishing aids produce a poor surface lustre or smudgy appearance on molded ethyl cellulose materials.

Normally, to minimize skinning or fuzzing, amounts of active plasticizers larger than usual have been employed in formulating said ethyl cellulose compositions. However, an increase in plasticizer content does not begin to cause the skinning and fuzzing to disappear until about 25 parts by weight of the active plasticizer are incorporated in about 100 parts by weight of ethyl cellulose. The disadvantage accompanying an increase in the amount of active plasticizer in the composition is that the added plasticizer yields molded articles which are excessively soft as measured on the Rockwell scale, (A. S. T. M.—D229–43). The resulting composition yields articles which are of a rubbery character and unsatisfactory for use in forming articles such as radio grills and cabinets, flashlights, cigarette cases, etc., where fairly hard compositions are desired. One advantage which is gained by increasing the amount of active plasticizing agent present is the production of plasticized ethyl cellulose compositions having an easier flow during injection molding operations and a somewhat higher impact strength.

Where only an inactive plasticizer such as mineral oil is employed, the hardness of the resulting molded ethyl cellulose composition is usually higher than that of a composition containing an equal amount of an active plasticizer but the impact strength is lower. Increasing the amount of mineral oil in a given ethyl cellulose composition where the mineral oil is the sole plasticizer does not cause as great or as sharp a drop in the hardness characteristics of the resulting composition as is the case where the amount of an active plasticizer present is increased. The tolerance of the ethyl cellulose compositions toward the use of mineral oil as a plasticizer is, however, limited since excessive amounts yield a product having an undesirable greasy feel and exhibiting exudation in humidities slightly above normal. Furthermore, even with the maximum amount of mineral oil present, the skinning and fuzzing trouble still exists. In order to gain greater flow characteristics than are possible with the maximum tolerated amount of mineral oil present, an active plasticizer of some type is usually employed in conjunction with the mineral oil. However, the addition of even moderate amounts of an active plasticizer to an ethyl cellulose composition containing mineral oil causes a pronounced drop in the hardness properties of said ethyl cellulose composition. Consequently, the difficulty confronting those skilled in the art was the formulation of adequately plasticized ethyl cellulose compositions having the high impact strength and good flow characteristics of compositions containing fairly large amounts of an active plasticizer, yet which still retain to a substantial degree the desirable hardness characteristics which result from the use of mineral oil alone.

We have now found that by suitably formulating ethyl cellulose molding compositions employing as the plasticizing agent therein particular proportions of a combination of both an active and an inactive plasticizer there is obtained a substantial reduction or even complete elimination of surface skinning and fuzzing in articles molded from such ethyl cellulose compositions without loss of any of the highly desirable properties of said compositions. In accordance with our invention, these valuable ethyl cellulose molding compositions may be obtained by compounding 100 parts by weight of ethyl cellulose of an ethoxyl value of from about 44.5 to 46.5% with from about 10 to 30 parts by weight of a plasticizing composition comprising a mixture of mineral oil as the inactive plasticizer and partially hydrogenated mixed isomeric terphenyls as the active plasticizer, the composition containing at most about 8 parts by weight of mineral oil with the partially hydrogenated terphenyl being present in a ratio of from 1:1 to 3:1 by weight with respect to the mineral oil. Any suitable refined mineral oil such as those refined mineral oils sold under the trade names of, for examples, "Marcol GX," which is an odorless, tasteless and colorless mineral oil having a specific gravity of 0.835 to 0.845 and a viscosity of 65 to 75 Saybolt seconds at 100° F.; "Marcol JX," "Ervol," "Blandol," which are U. S. P. light, white mineral oils; "Fractol A," which is an odorless and tasteless mineral oil having a specific gravity of 0.875 to 0.885 and a viscosity of 200 to 210 Saybolt seconds at 100° F.; and is satisfactory.

The partially hydrogenated mixed isomeric terphenyls which we preferably employ are those produced by a process involving the partial hydrogenation of the higher boiling fraction of byproduct hydrocarbons obtained during the preparation of biphenyl by the pyrolysis of benzene.

In accordance with the commercial pyrolysis process benzene vapors are passed through heated tubes or screens, through molten metals or molten salts. The main products formed are biphenyl, hydrogen and a light-colored waxy fraction of higher boiling hydrocarbons, comprising a mixture of isomeric terphenyls, which boils above about 370° C. On partial or incomplete catalytic hydrogenation of this solid higher boiling waxy fraction at a temperature of 160 to 225° C. employing a nickel hydrogenation catalyst and a hydrogen pressure of 500 to 900 pounds per square inch, the desired mixture of partially hydrogenated isomeric terphenyls is obtained. The latter is a clear, stable, almost colorless and odorless liquid having a specific gravity of from about 1.05 to 0.970 at 25° C. and boils above 340° C. at normal pressure. This liquid mixture will be referred to in the appended claims by the term "partially hydrogenated mixed isomeric terphenyls."

Optimum results are obtained employing ethyl cellulose of an ethoxyl value of 45.5 to 46.5% for proper colloidalization or conversion and of a centipoise viscosity of 80 to 100 for adequate toughness, measured at 25° C. using a 5% solution of the ethyl cellulose dissolved in a mixture comprising 70% toluene and 30% ethyl alcohol by weight for determining said viscosity. In some instances it is desirable that the ethyl cellulose composition should also contain 0.1 to 5 parts by weight of a stabilizer such as diphenylamine, menthyl phenol, an alkyl or aryl sulfite, or unstable organic sulfones.

Surprisingly enough, we have found that the plasticizing action of hydrogenated terphenlys in combination with mineral oil not only yields ethyl cellulose compositions of greatly enhanced impact strength and flow but the presence of hydrogenated terphenyls does not effect any substantial decrease in the hardness characteristics of the ethyl cellulose compositions as is the case where ordinary active plasticizers are employed in conjunction with mineral oil. Thus, the ethyl cellulose compositions formulated within the specific range mentioned above, in accordance with our invention, yield molded articles which retain their high strength, toughness and their excellent dimensional stability characteristics, yet are substantially free from the undesirable skinning effect. Furthermore, as indicated, said molded ethyl cellulose articles may be polished to a high gloss on a hard wheel, or rubbed or buffed without fuzzing. The compositions may be employed in extrusion molding as well as injection molding operations or for the preparation of ethyl cellulose sheet materials by extrusion or by block pressing and planer cutting methods.

In order further to illustrate our invention but without being limited thereto, the following examples are given:

*Example I*

An ethyl cellulose molding material of the following composition is prepared in the usual manner.

| | Parts by weight |
|---|---|
| Ethyl cellulose (46.5% ethoxyl) | 100 |
| Partially hydrogenated mixed isomeric terphenyls | 12 |
| Fractol A (refined mineral oil) | 7 |
| Decyl sulfite (stabilizer) | 1 |
| Color | q. s. |

On being injection or extrusion molded at a temperature of about 450° F. in the manner well known in the art, the molded object obtained has a good gloss and is found to be substantially free from the skinning or surface lamination effect and also from fuzzing or rub-up when rubbed with pressure or buffed on a hard wheel. The above composition is highly useful in the manufacture of articles such as radio grilles or cabinets, cigarette cases, compacts, flashlight cases, etc.

*Example II*

An ethyl cellulose molding material of the following composition is prepared in the usual manner.

| | Parts by weight |
|---|---|
| Ethyl cellulose (45.5% ethoxyl) | 100 |
| Partially hydrogenated mixed isomeric terphenyls | 16 |
| Marcol JX (refined mineral oil) | 8 |
| Alpha-butylene sulfone (unstable organic sulfone stabilizer) | 2 |

This composition may be injection or extrusion molded at a temperature of from about 400 to 425° F. and yields molded objects of high strength which do not suffer from skinning or surface lamination nor from fuzzing or rub-up in service or when buffed on a hard wheel. This composition is very useful for the production of tool handles, vacuum cleaner housings, etc., where high strength is required.

The good physical properties of the molded objects prepared from the ethyl cellulose compositions in the examples given above are as follows:

| Test | A. S. T. M. Method | Example I | Example II |
|---|---|---|---|
| Olsen flow | D569-43 | 135° C | 128° C. |
| Rockwell (R Scale) Hardness | D229-43 | 90 | 80. |
| Izod Impact at 77° F | D256-43T | 7.4 | 7.6. |
| Heat Distortion | D648-45T | 47° C | 47° C. |
| Flexural Str | D650-42T | 5800 p. s. i. | 5000 p. s. i. |
| Water Absorp | D570-42 | 1.4% | 1.4%. |

It is to be understood that the foregoing detailed description is given merely by way of illustration and that many variations may be made therein without departing from the spirit of our invention.

Having described our invention, what we desire to secure by Letters Patent is:

1. A thermoplastic composition yielding products characterized by high impact strength and relatively high hardness, comprising ethyl cellulose plasticized with a plasticizing agent comprising refined mineral oil and liquid partially hydrogenated mixed isomeric terphenyls, said isomeric terphenyls being obtained by the pyrolysis of benzene.

2. A thermoplastic composition yielding molded products characterized by high impact strength and relatively high hardness, comprising about 100 parts by weight of ethyl cellulose plasticized with from about 10 to 30 parts by weight of a plasticizing agent comprising refined mineral oil and liquid partially hydrogenated mixed isomeric terphenyls, said isomeric terphenyls being obtained by the pyrolysis of benzene, said composition containing at most about 8 parts by weight of mineral oil with the partially hydrogenated terphenyls being present in a ratio of from 1:1 to 3:1 by weight with respect to the mineral oil.

3. A thermoplastic composition yielding molded products characterized by high impact strength and relatively high hardness, comprising about 100 parts by weight of ethyl cellulose of an ethoxyl value of 44.5 to 46.5% plasticized with from about 10 to 30 parts by weight of a plasticizing agent comprising refined mineral oil and liquid partially hydrogenated mixed isomeric terphenyls, said isomeric terphenyls being obtained by the pyrolysis of benzene, said composition containing at most about 8 parts by weight of mineral oil with the partially hydrogenated terphenyls being present in a ratio of from 1:1 to 3:1 by weight with respect to the mineral oil.

4. A thermoplastic composition yielding molded products characterized by high impact strength and relatively high hardness, comprising about 100 parts by weight of ethyl cellulose of an ethoxyl value of 45.5 to 46.5% and of a centipoise viscosity of 80 to 100 plasticized with from about 10 to 30 parts by weight of a plasticizing agent comprising refined mineral oil and liquid partially hydrogenated mixed isomeric terphenyls, said isomeric terphenyls being obtained by the pyrolysis of benzene, said composition containing at most about 8 parts by weight of mineral oil with the partially hydrogenated terphenyls being present in a ratio of from 1:1 to 3:1 by weight with respect to the mineral oil.

5. A thermoplastic composition yielding molded products characterized by high impact strength and relatively high hardness, comprising about 100 parts by weight of ethyl cellulose of an ethoxyl value of 46.5% plasticized with a mixture of 12 parts by weight of liquid partially hydrogenated mixed isomeric terphenyls, said isomeric terphenyls being obtained by the pyrolysis of benzene, and 7 parts by weight of refined mineral oil.

6. A thermoplastic composition yielding molded products characterized by high impact strength and relatively high hardness, comprising about 100 parts by weight of ethyl cellulose of an ethoxyl value of 45.5% plasticized with 16 parts by weight of liquid partially hydrogenated mixed isomeric terphenyls, said isomeric terphenyls being obtained by the pyrolysis of benzene, and 8 parts by weight of refined mineral oil.

7. A thermoplastic composition yielding molded products characterized by high impact strength and relatively high hardness, comprising about 100 parts by weight of ethyl cellulose of an ethoxyl value of 46.5% plasticized with a mixture of 12 parts by weight of liquid partially hydrogenated mixed isomeric terphenyls, said isomeric terphenyls being obtained by the pyrolysis of benzene, and 7 parts by weight of refined mineral oil and containing a stabilizing agent.

8. A thermoplastic composition yielding molded products characterized by high impact strength and relatively high hardness, comprising about 100 parts by weight of ethyl cellulose of an ethoxyl value of 45.5% plasticized with 16 parts by weight of liquid partially hydrogenated mixed isomeric terphenyls, said isomeric terphenyls being obtained by the pyrolysis of benzene, and 8 parts by weight of refined mineral oil and containing a stabilizing agent.

WILLIAM P. MOELLER.
JOHN H. PRICHARD.

REFERENCES CITED

The following references are of record in the file of this patent:

UNITED STATES PATENTS

| Number | Name | Date |
|---|---|---|
| 2,229,018 | Smith | Jan. 14, 1941 |

FOREIGN PATENTS

| Number | Country | Date |
|---|---|---|
| 90,010 | Austria | Nov. 25, 1922 |

OTHER REFERENCES

Circular 685, "The Terphenyls," Scientific Section, National Paint-Varnish and Lacquer Association, Incorporated, Washington, D. C., June, 1944, pages 179 to 182.

Huckel et al., "Ann. der Chem.," 540, 178 (1939).